(12) United States Patent
Seymour

(10) Patent No.: US 7,701,081 B2
(45) Date of Patent: Apr. 20, 2010

(54) SYSTEM, METHOD AND APPARATUS FOR PROVIDING DIRECT CURRENT

(75) Inventor: Eric Seymour, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 360 days.

(21) Appl. No.: 11/967,849

(22) Filed: Dec. 31, 2007

(65) Prior Publication Data

US 2009/0167086 A1    Jul. 2, 2009

(51) Int. Cl.
 *H02J 1/00* (2006.01)
 *H02J 3/00* (2006.01)
(52) U.S. Cl. .......................... 307/11; 307/45
(58) Field of Classification Search .......... 307/11, 307/12, 24, 45, 31
 See application file for complete search history.

(56) References Cited

U.S. PATENT DOCUMENTS

| | | | |
|---|---|---|---|
| 4,054,827 A | 10/1977 | Reimers | |
| 5,451,962 A | 9/1995 | Steigerwald | |
| 5,781,419 A | 7/1998 | Kutkut | |
| 6,115,273 A | 9/2000 | Geissler | |
| 6,266,260 B1 | 7/2001 | Zahrte, Sr. | |
| 6,404,655 B1 | 6/2002 | Welches | |
| 6,625,046 B2 | 9/2003 | Geissler | |
| 2005/0139259 A1 | 6/2005 | Steigerwald | |
| 2005/0180181 A1* | 8/2005 | Gaudreau et al. | 363/71 |
| 2006/0221653 A1 | 10/2006 | Lai | |

* cited by examiner

*Primary Examiner*—Albert W Paladini
*Assistant Examiner*—Carlos Amaya
(74) *Attorney, Agent, or Firm*—Sean R. O'Dowd; Neugeboren O'Dowd PC

(57) ABSTRACT

A system and method for providing direct-current power is described. In one embodiment a direct current voltage is converted into at least two regulated DC voltages, and a first of the at least two regulated DC voltages is applied across a first and second outputs and a second of the at least two regulated DC voltages is applied across the second output and a third output. And when a first impedance across the first and second outputs is less than a second impedance across the second and third outputs, current is received via the second output while delivering power to the first and second impedances.

19 Claims, 7 Drawing Sheets

SYSTEM, METHOD AND APPARATUS FOR PROVIDING DIRECT CURRENT

FIELD OF THE INVENTION

The present invention relates to power supplies. In particular, but not by way of limitation, the present invention relates to systems and methods for providing regulated direct current.

BACKGROUND OF THE INVENTION

There are currently many systems that operate under direct current (DC) power, and many additional systems that operate under alternating current (AC) power that may be converted to operate under DC power due to benefits in cost, voltage regulation tolerances and energy efficiency.

For example, power provided to processing tools for flat-panel processing and semiconductor processing may be distributed by DC systems. In addition, power distribution for data centers (e.g., server farms), commercial buildings and military applications may be best suited to DC power distribution.

Power, however, is typically distributed by utilities at AC voltages that requires high power conversion from AC to DC voltages. Most commonly, service entrance voltages provided by utilities are 480, 400, and 380 voltages for North America, Europe and Asia, respectively. But the DC voltages that are typically utilized are not easily and/or efficiently derived from these AC voltages. To arrive at a usable DC voltage, for example, the source AC voltage is typically converted to the desired DC voltage by stepping the AC voltage down with a transformer prior to rectification or using a two-stage conversion process. Both of these solutions, however, are expensive and lossy. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one exemplary embodiment, the present invention may be characterized as an apparatus comprising a rectifier configured to rectify an alternating-current (AC) voltage so as to generate a first direct-current (DC) voltage and a regulator including a first, second, and third outputs, the first and second outputs configured to connect to a first load and the second and third outputs configured to couple to a second load. The regulator in this embodiment is configured to apply, using the first direct-current voltage, a regulated second DC voltage between the first and the second outputs and a regulated third DC voltage between the second and third outputs, each of the regulated second and third DC voltages having a magnitude that is less than the magnitude of the first DC voltage.

In another embodiment, the invention may be characterized as a method for providing direct-current power, the method including converting a direct current voltage into at least two regulated DC voltages, applying a first of the at least two regulated DC voltages across a first and second outputs and a second of the at least two regulated DC voltages across the second output and a third output, and receiving, when a first impedance across the first and second outputs is less than a second impedance across the second and third outputs, current via the second output while delivering power to the first and second impedances.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
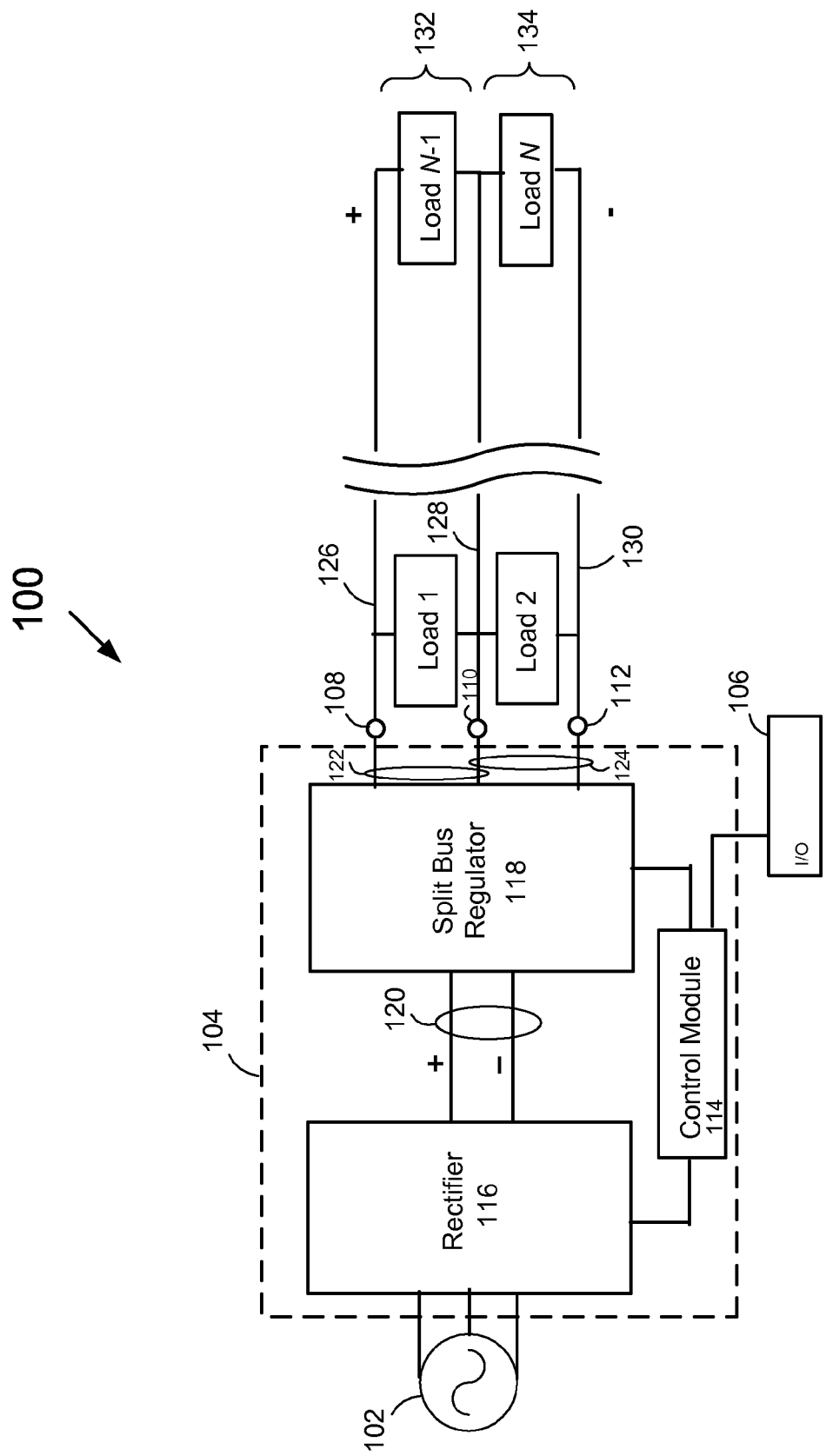
FIG. 1 is a block diagram depicting an exemplary embodiment of the present invention.

Referring now to the drawings, where like or similar elements are designated with identical reference numerals throughout the several views, and referring in particular to FIG. 1, it is a block diagram 100 depicting an exemplary embodiment of the present invention. Shown are an AC source voltage 102, a DC power supply 104 that is coupled to both an in input/output (I/O) module 106 and N loads via three outputs 108, 110, 112. The DC power supply 104 in this embodiment includes a control module 114 coupled to the I/O module 106, a rectifier 116 and a split bus regulator 118.

The magnitude of the AC source voltage 102 that is applied to the rectifier 116 may vary depending upon the originator of the AC source voltage 102. In North America, power is often distributed at 480 AC, and in Europe power is frequently distributed at 400 AC volts while in Asia 380 volts AC is a common distribution voltage. In some embodiments for example, the AC power source is a 4-wire wye-configured power source that provides 480 volts line-to-line and 277 volts line-to-neutral. In other embodiments the AC power source is a 3-wire delta-configured power source that provides 480 volts line-to-line. In yet other embodiments the AC power source is a 4-wire wye-configured power source that provides 208 volts line-to-line and 120 volts line-to-neutral. And in still other embodiments the AC power source is a 4-wire delta-configured power source that provides 240 volts line-to-line and 120 volts line-to-neutral. The AC power source may also be a single phase source including a 2-wire 120 volt source or a 3-wire 120 and 240 volt source.

The rectifier 116 in the exemplary embodiment is an active rectifier configured to rectify the AC source voltage 102 and provide a regulated DC voltage 120, also referred to herein as a DC source voltage 120, that is applied to the split bus regulator 118. In several embodiments the DC source voltage 120 is produced without the AC source voltage 102 being stepped down. In some embodiments for example, the rectifier 116 is configured to rectify an AC source voltage 102 that is 480 volts AC and apply the DC source voltage 120 to the split bus regulator 118 at a range of voltages in excess of 650 DC volts. In other embodiments the rectifier is configured to rectify 480, 400 or 380 Vac and provide the DC source voltage 120 to the split bus regulator 118 at a fixed 760 Vdc. In other embodiments, the DC power supply 104 is configured to receive a DC voltage and need not include the rectifier 116.

In general, the split bus regulator 118 is configured, responsive to the DC source voltage 120, to apply a second regulated DC voltage 122 across the first output 108 and the second output 110 and a third regulated DC voltage 124 across the second output 110 and the third output 112 of the DC power supply 104. Both the second and third regulated voltages 122, 124 are less than the DC source voltage 120. As a consequence, two reduced and regulated DC voltages are produced without either employing a step-down transformer prior to rectification or a bucking stage following rectification.

As depicted in FIG. 1, the DC power supply 104 in the present embodiment provides power to N loads with three conductors 126, 128, 130. In particular, the second regulated DC voltage 122 is applied to a first set of loads 132 with a first outer conductor 126 and a center conductor 128, and the third regulated DC voltage 124 is applied to a second set of loads 134 with the center conductor 128 and a second outer conductor 130.

In some embodiments, split bus regulator 118 is configured so that the second regulated DC voltage 122 and the third regulated DC voltage 124 have substantially the same magnitude. These embodiments are beneficial, for example, where the first and second sets of loads 132, 134 both operate at the same voltage.

In other embodiments, the split bus regulator 118 is configured so that the second regulated DC voltage 122 and the third regulated DC voltage 124 have different voltages. These embodiments are beneficial, for example, where the first set of loads 132 operates at one voltage and the second set of loads 132 operates at another voltage.

In many embodiments, the split bus regulator 118 is configured to apply a voltage between the first output 108 and the third output 112 that is substantially the same (e.g., 380 Vdc) as the DC source voltage 120. In some instances the voltage applied to the first 108 and third output 112 is low enough so that the three conductors 126, 128, 130 may be assembled in close proximity (e.g., in a single cable and/or single piece of conduit) to feed power to the N loads, which may be located remotely from the DC power supply 104.

Figure 2:
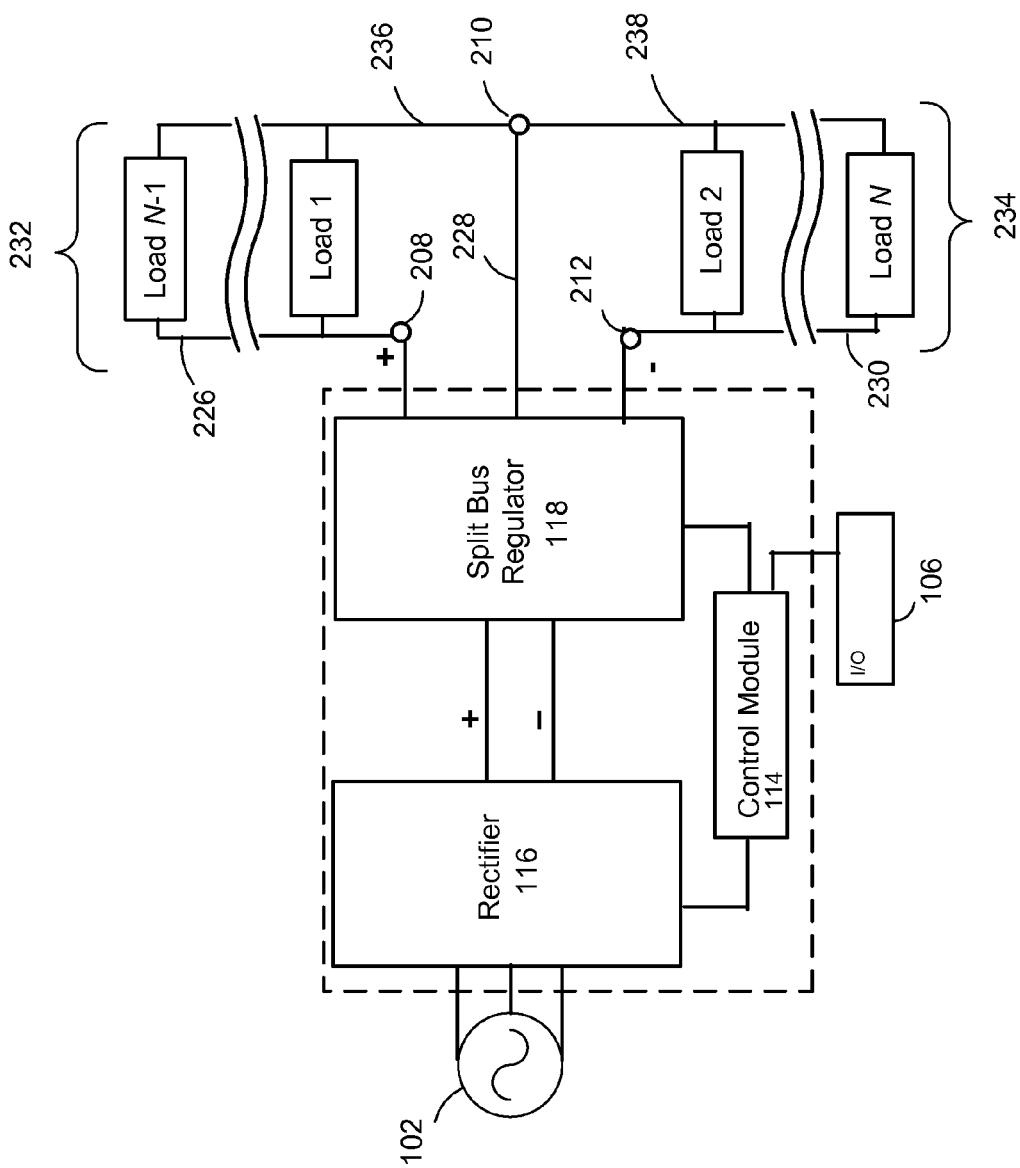
FIG. 2 is a block diagram depicting another embodiment of the present invention.

In other embodiments, however, the split bus regulator 118 may apply a voltage between the first output 108 and the third output 112 that requires the first and second outer conductors 126, 130 to be physically separated so as to conform with electrical codes. Referring to FIG. 2, for example, shown is another embodiment in which a second output 210 is adapted to couple to separate conductors 236, 238 so that a first and second outer conductors 226, 230 may be separated to comply with electrical codes. In this embodiment the voltage between the first and second outputs 208, 210 is applied to a first set of loads 232 with a separate feed (e.g., cable and/or conduit) than the voltage applied to a second set of loads 234 from the second and third outputs 210, 212.

As discussed further herein, in many embodiments, when the first set of loads 132, 232 and the second set of loads 134, 234 are symmetrical, the split bus regulator 118 operates at a very efficient state and most of the energy losses of the DC power supply 104 are due to losses from the rectifier 116. And in several implementations, the potential of the center conductor 128, 228 is at, or very near, ground. As a consequence, the center conductor 128, 228 may be designated as a neutral line, which does not require additional protective switch gear; thus saving a substantial amount of money.

In many embodiments, when the first set of loads 132, 232 and the second set of loads 134, 234 are asymmetrical, current may flow in the center conductor 128, 228 in the direction of the split bus regulator 118 while providing power to both the first set of loads 132, 232 and the second set of loads 134, 234.

The control module 114 in this embodiment is generally configured to enable control, via the I/O module 106, of the rectifier 116 and the split bus regulator 118. The control module 114 may be realized by hardware, software or a combination thereof, but it should be realized that the control module may be implemented by separate components and that the rectifier 116 and the regulator 118 need not be coupled together by a common control structure. The I/O module 106 may be realized by one or more of a display, keyboard, pointing device, and/or touch screen device.

Figure 3:
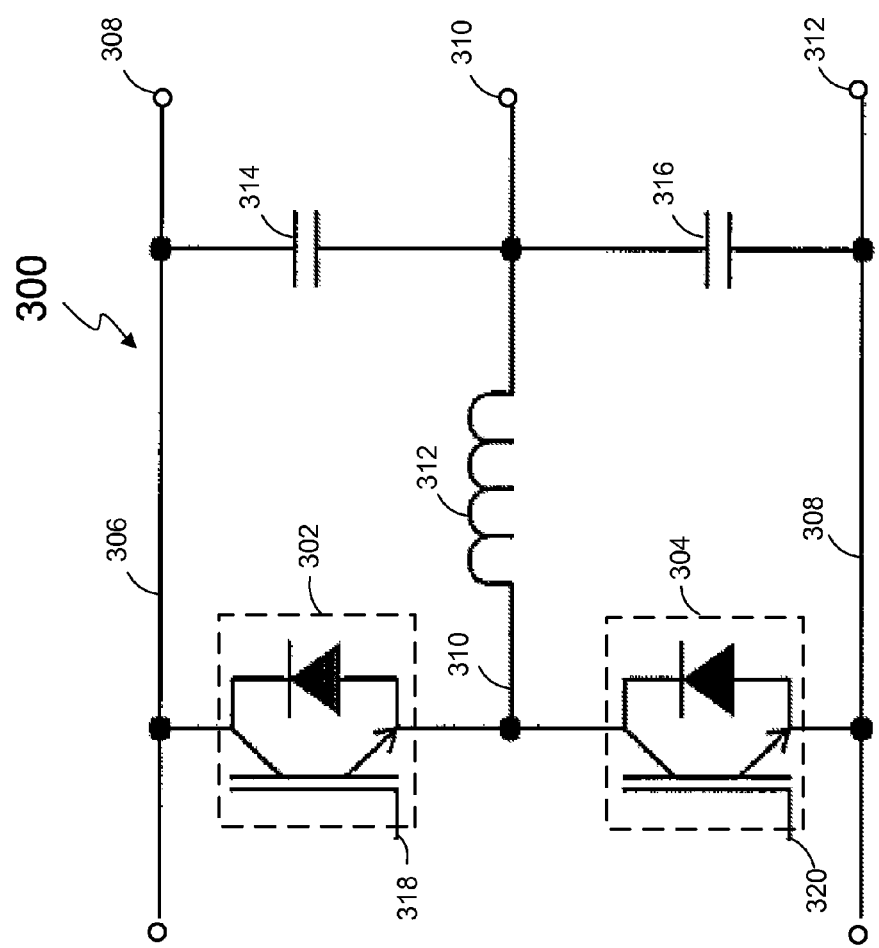
FIG. 3 is a schematic diagram of an exemplary embodiment of the split bus regulator depicted in FIGS. 1 and 2.

Referring next to FIG. 3, shown is a block diagram 300 of an exemplary embodiment of the split bus regulator 118 depicted in FIGS. 1 and 2. As depicted, in this embodiment there are a first and second electrically-controlled switches 302, 304 that are arranged in series so that the series combination of the switches 302, 304 is disposed across a first outer conductor 306 and a second outer conductor 308. As shown, a center conductor 310 is coupled between the first and second electrically-controlled switches 302, 304 and includes an inductive element 312. In addition, a first capacitor 314 is coupled between the first outer conductor 306 and a center conductor 310 and a second capacitor 316 is coupled between the second outer conductor 308 and the center conductor 310. The first and second capacitors 314, 316 in the exemplary embodiment have the same value and each of the electronically controlled switches 302, 304 are substantially identical so that the split bus regulator 300 is substantially symmetrical relative to the center conductor 310.

Each of the electrically-controlled switches 302, 304 depicted in FIG. 3 are realized by the combination of an insulated gate bipolar transistor (IGBT) and a passive diode. But this is certainly not required, and in other embodiments one or more other switching devices may be utilized to implement the switches 302, 304. In one embodiment for example, field effect transistors (FETs) are utilized, and in another embodiment insulated gate commutating thyristors (IGCTs) are utilized. It is contemplated, however, that other switching devices may be utilized in other embodiments. It should be recognized that the diodes depicted in the switches 302, 304 may be integrated so as to be contained in the same package, but this is not required, and the diodes may be added as a separate component to the switching element.

As shown, each of the switches 302, 304 is controllable with a corresponding input 318, 320 that connects with the control module 114 depicted in FIG. 1. In operation, each of the switches 302, 304 nominally operate at a fifty percent duty cycle. Although not required, in many embodiments the voltage of the center conductor 310 is fed back to the control module 114 and the control module 114 modulates the duty cycle of the switches 318, 320 by sending control signals to the input lines 318, 320.

In general, the split bus regulator 300 is configured, responsive to a DC source voltage applied across the first and second outer conductors 306, 308, to apply a second regulated DC voltage across a first output 308 and a second output 310 and a third regulated DC voltage across the second output 310 and the third output 312 of the split bus regulator 300. Both the second and third regulated voltages are less than the DC source voltage. As a consequence, two reduced and regulated DC voltages are produced without either employing a step-down transformer prior to rectification or a bucking stage following rectification.

In the exemplary embodiment depicted in FIG. 3, if the load impedance across the first and second outputs 308, 310 is less than another load placed across the second and third outputs 310, 312, then current flows into the second output 310 and through the center conductor in the direction of the switches 318, 320 while power is delivered to both loads. If, however, the load impedance across the second and third outputs 310, 312 is less than the load across the first and second outputs 308, 310, then current flows in the center conductor 310 away from the switches 318, 320 in the direction of the second output 310 while power is delivered to both loads; thus the split bus regulator 300 may have bidirectional current flow within the center conductor 310 while power is delivered to a load across the first and second outputs 308, 310 and another load placed across the second and third outputs 310, 312.

Figure 4:
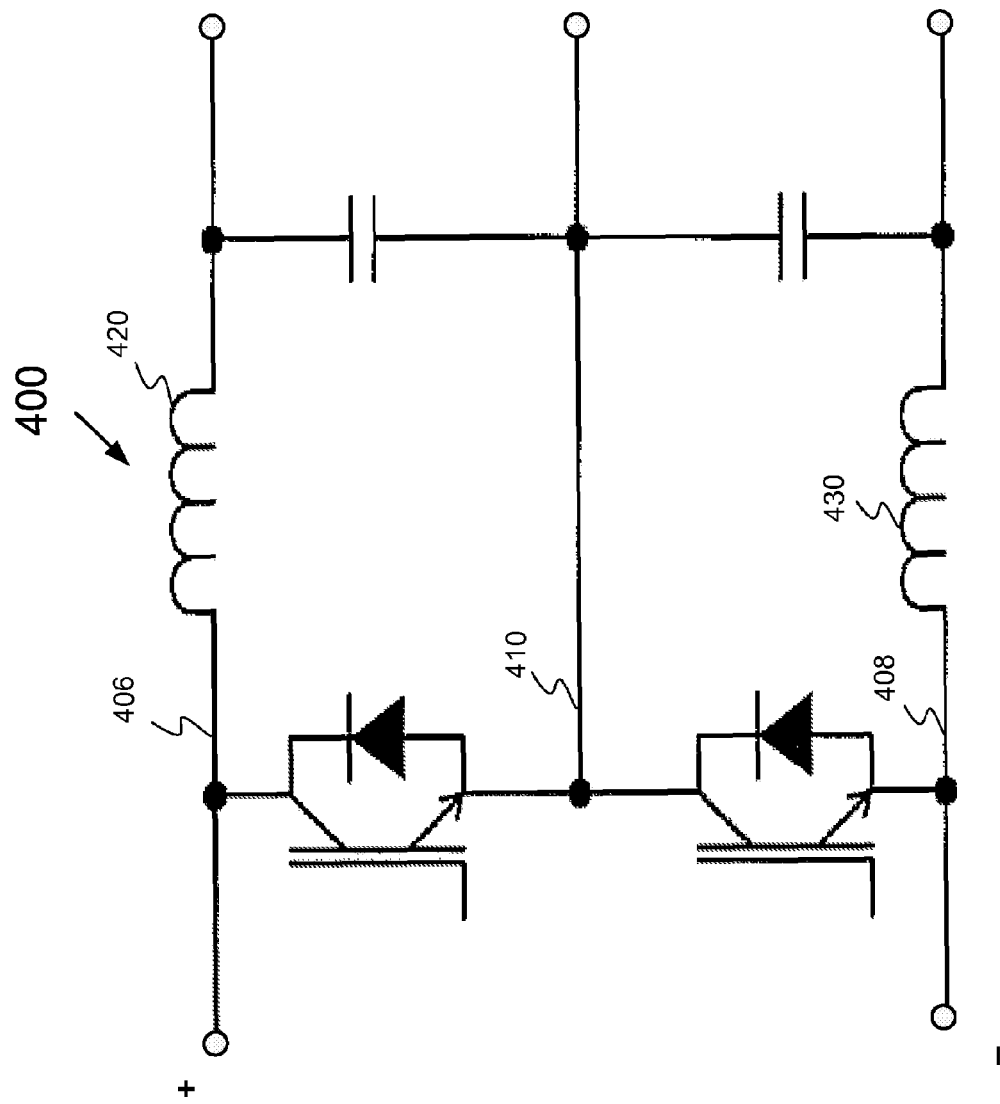
FIG. 4 is a schematic diagram of another embodiment of the split bus regulator depicted in FIGS. 1 and 2.

Referring next to FIG. 4, shown is a schematic diagram of another embodiment of the split bus regulator 118 depicted in FIGS. 1 and 2. The split bus regulator 400 is similar to the split bus regulator 300 depicted in FIG. 3 except the inductor 312 is replaced with a first inductor 420 in a first outer conductor 406 and a second inductor 430 in the second outer conductor 408.

Figure 5:
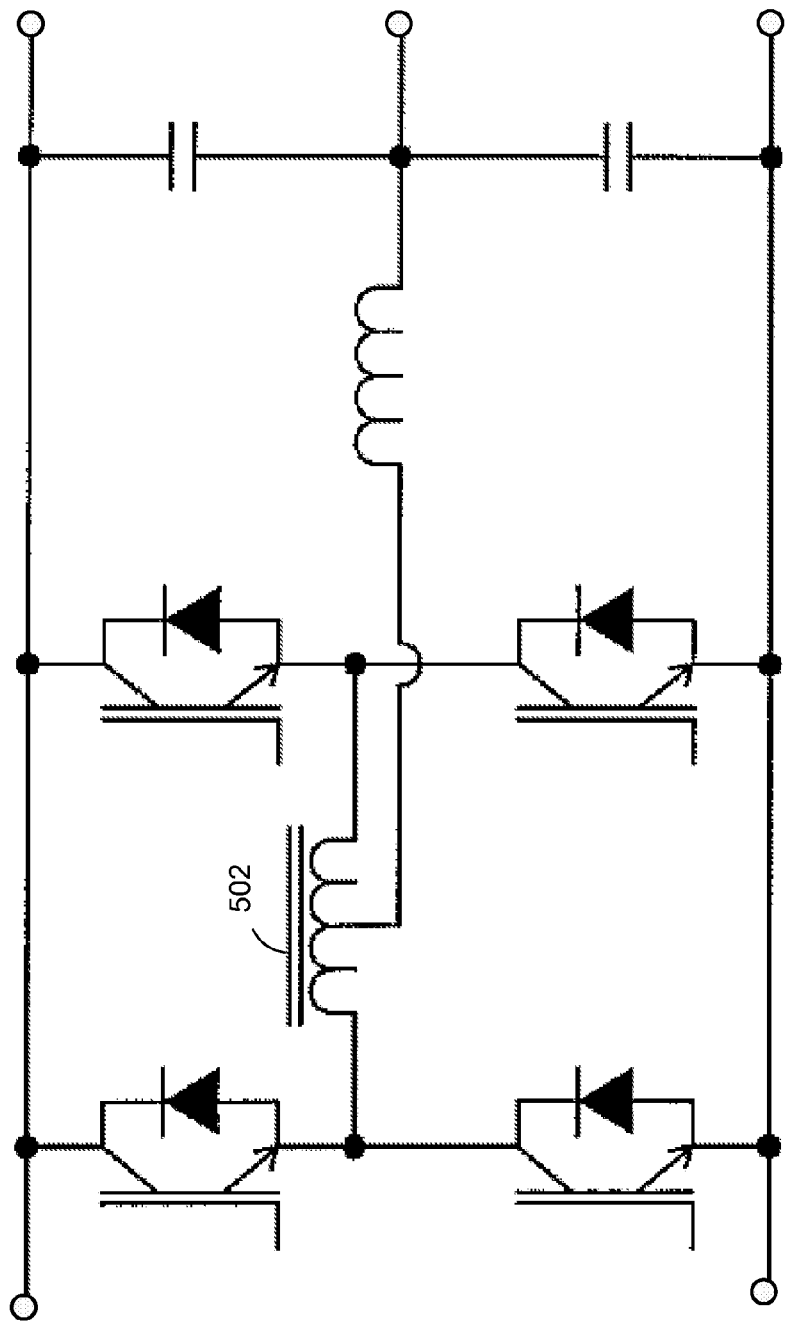
FIG. 5 is a schematic diagram of yet another embodiment of the split bus regulator depicted in FIGS. 1 and 2.

Referring next to FIG. 5, shown is a schematic diagram of yet another embodiment of the split bus regulator 118 depicted in FIGS. 1 and 2. As shown, in this embodiment a commutating inductor 502 is utilized to provide soft switching to in order to increase the overall energy efficiency of the split bus regulator.

Figure 6:
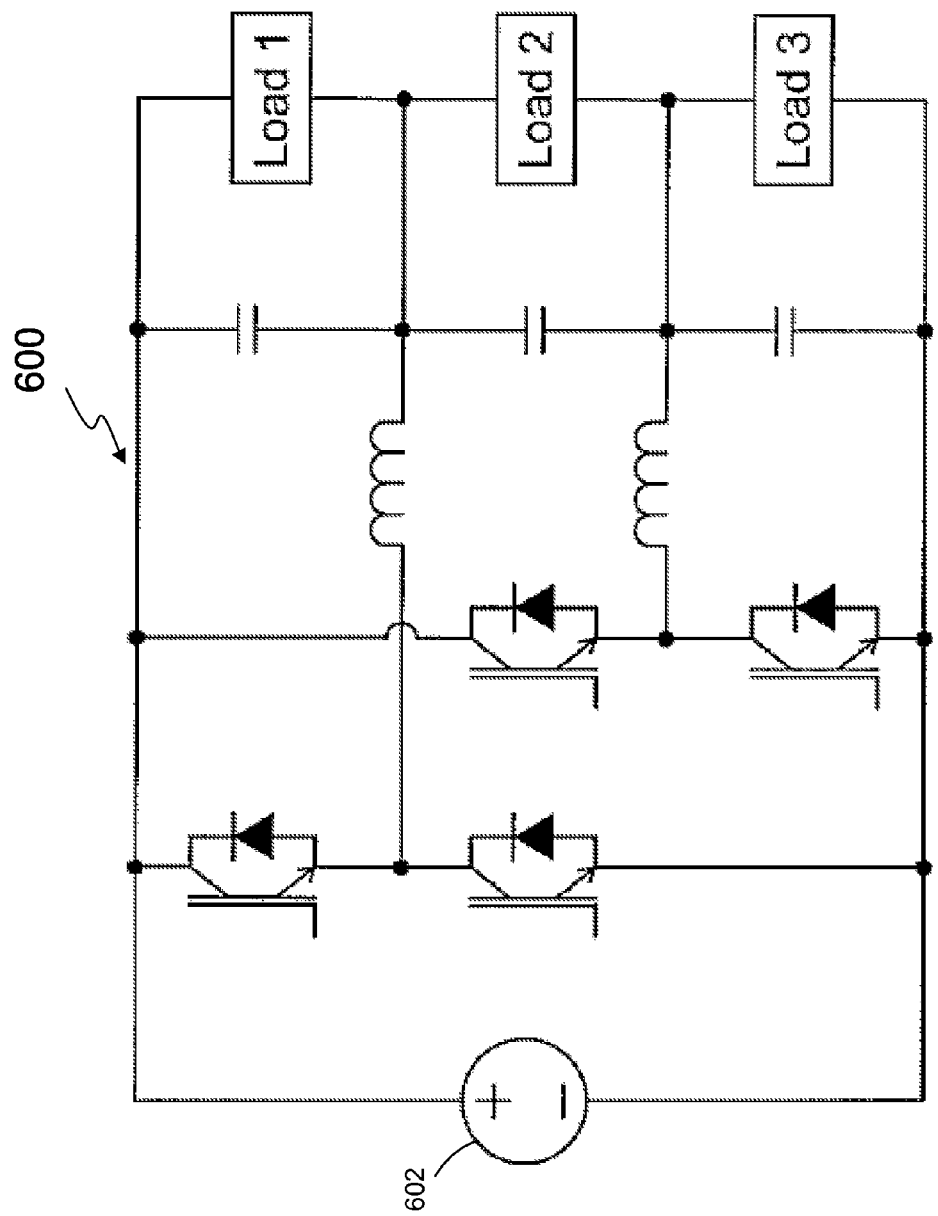
FIG. 6 is a schematic diagram of yet another embodiment of a split bus regulator.

Referring next to FIG. 6, shown is an exemplary embodiment of a multiple-split-bus regulator 600. As shown, in this embodiment, the multiple-split-bus regulator 600 is capable of driving three loads. Although not required, the voltage across each load may be 300 Volts so that the total voltage across Load 1, Load 2, and Load 3 is 900 Volts. Beneficially, this embodiment also provides 600 and 900 volts if needed. Additionally, one of ordinary skill, in light of this disclosure, will recognize that alternative voltages may be generated and that the voltages may be asymmetrical.

Figure 7:
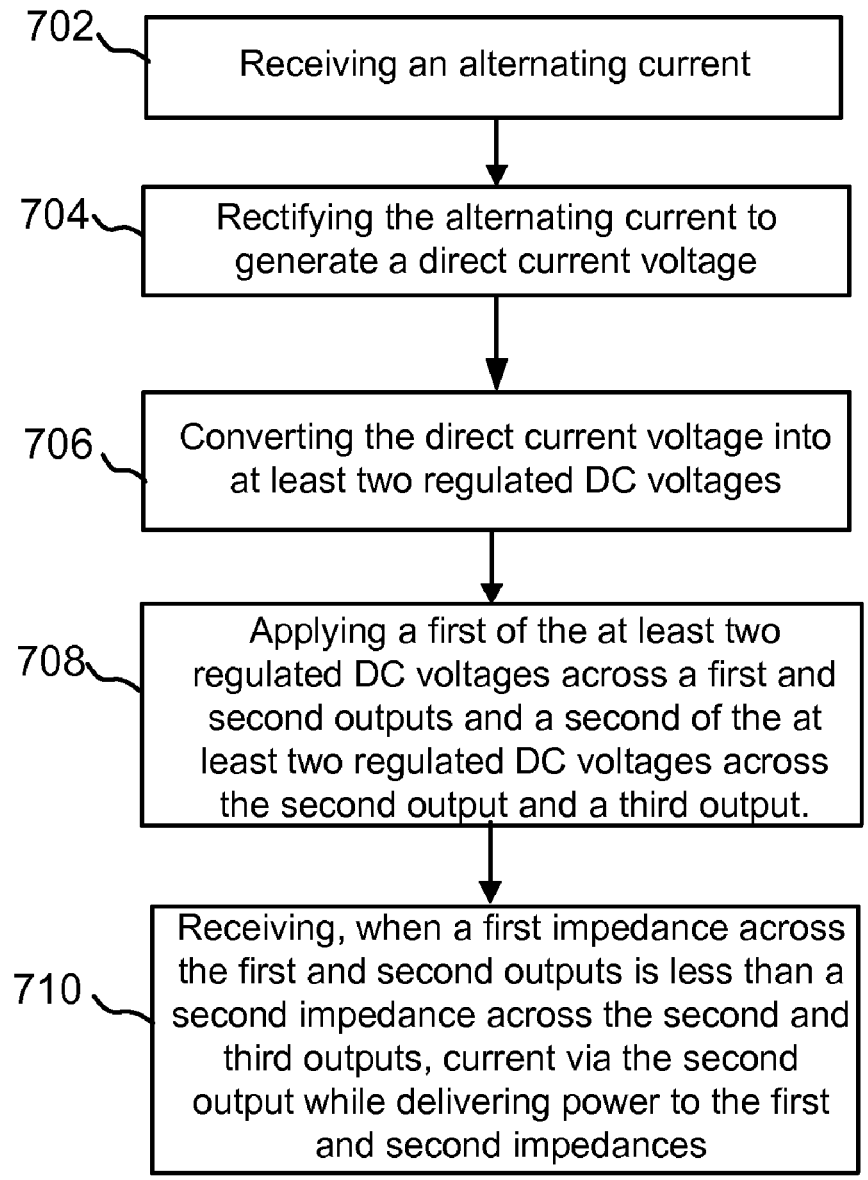
FIG. 7 is a flowchart depicting an exemplary method in accordance with several embodiments of the present invention.

Referring to FIG. 7, shown is a flowchart depicting an exemplary method in accord with the embodiments described with reference to FIGS. 1-6. As shown, an alternating current is received (e.g., from the AC source voltage 102)(Block 702) and is rectified to generate a direct current voltage (e.g., regulated DC voltage 120)(Block 704). The direct current voltage is then converted into at least two regulated DC voltages (e.g., regulated DC voltages 122, 124)(Block 706).

As depicted in FIG. 7, a first of the at least two regulated DC voltages (e.g., regulated voltage 122) is applied across a first and a second outputs (e.g., the first and second outputs 108, 110) and a second of the at least two regulated voltages (e.g., regulated voltage 124) is applied across the second and a third output (e.g., the second and third outputs 110, 112) (Block 708). And when a first impedance (e.g., the impedance of the first set of loads 132) across the first and second outputs is less than a second impedance (e.g., the impedance of the first set of loads 134) across the second and third outputs, current is received via the second output (e.g., the second output 110) while power is delivered to the first and second impedances (e.g., the impedances of the first and second sets of loads 132, 134) (Block 710).

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. An apparatus comprising:
a rectifier configured to rectify an alternating-current (AC) voltage so as to generate a first direct-current (DC) voltage; and
a switch-mode regulator including a first, second, and third outputs, the first and second outputs configured to connect to a first load and the second and third outputs configured to couple to a second load, wherein the regulator is configured to apply, using the first direct-current voltage, a regulated second DC voltage between the first and the second outputs and a regulated third DC voltage between the second and third outputs, each of the regulated second and third DC voltages having a magnitude that is less than the magnitude of the first DC voltage;
wherein the switch-mode regulator is configured to receive current from the second output, while providing power to the first and second loads, when an impedance of the first load is less than an impedance of the second load and the regulator is configured to send current out of the second output when the impedance of the second load is less than the impedance of the first load.

2. The apparatus of claim 1, wherein the rectifier is an active-boost rectifier configured to generate the first direct-current (DC) voltage with a magnitude that exceeds the magnitude of a passively rectified DC voltage from the AC voltage.

3. The apparatus of claim 1, wherein the second output of the regulator includes two connectors, a first of the two connectors is adapted to connect to the first load and the second of the two conductors is adapted to connect to the second load so as to enable a voltage of the first output to be physically separated from a voltage of the third output.

4. The apparatus of claim 1, wherein the regulator includes a feedback line connected to the second output to enable closed-loop regulation of the regulated second and third voltages.

5. The apparatus of claim 1, including a visual indicator configured to alert a user of a load imbalance between the first load and the second load.

6. The apparatus of claim 1, wherein the regulator is configured to apply the regulated second DC voltage to the first and second outputs at the same magnitude as the regulated third DC voltage, and wherein a voltage between the first and third outputs has a magnitude that is approximately the magnitude of the first DC voltage.

7. The apparatus of claim 1, wherein the regulator includes a fourth output configured to connect to a third load, the regulator being configured to provide a regulated fourth voltage between the third output and the fourth output.

8. A method for providing direct-current power, comprising:
converting a direct current voltage into at least two regulated DC voltages;

applying a first of the at least two regulated DC voltages across a first and second outputs and a second of the at least two regulated DC voltages across the second output and a third output; and receiving, when a first impedance across the first and second outputs is less than a second impedance across the second and third outputs, current via the second output while delivering power to the first and second impedances.

9. The method of claim 8 including:
receiving an alternating current; and
rectifying the alternating current to generate the direct current voltage.

10. The method of claim 8, including:
applying the voltage of the second output to a first and second conductors; and
separately distributing the first and second of the at least two regulated DC voltages.

11. The method of claim 8, wherein converting includes converting the direct current voltage into three regulated DC voltages, and applying includes applying a third of the three regulated DC voltages across the third output and a fourth output.

12. The method of claim 8, wherein the voltage across the first and third outputs is substantially the same voltage as the direct current voltage.

13. The method of claim 8, wherein the converting includes dividing the direct current voltage and switch-regulating the divided voltage.

14. The method of claim 8 including modulating the at least two regulated DC voltages in response to feedback from at least one of the outputs.

15. An apparatus comprising:
a first and second outer conductors adapted to enable a direct current voltage to be applied across the first and second outer conductors;
a first and second electrically-controlled switches, the first and second electrically-controlled switches arranged in series to form a series combination, the series combination of the electrically-controlled switches disposed between the first and second outer conductors;
a center conductor coupled between the a first and second electrically-controlled switches, the first electrically-controlled switch regulating a second DC voltage that is applied between the first outer conductor and the center conductor, and the second electrically-controlled switch regulating a third DC voltage that is applied between the second outer conductor and the center conductor, wherein during operation, power is delivered, irrespective of the direction of current flow in the center conductor, to both a first load coupled between the first outer conductor and the center conductor and a second load coupled between the second outer conductor and the center conductor.

16. The apparatus of claim 15, wherein the center conductor includes an inductor configured to filter the voltage of the center conductor.

17. The apparatus of claim 15, wherein the first outer conductor includes a first inductor and the second outer conductor includes a second inductor.

18. The apparatus of claim 15, including a first capacitor coupled between the first outer conductor and the center conductor and a second capacitor coupled between the second outer conductor and the center conductor.

19. The apparatus of claim 15, wherein each of the first and second electrically-controlled switches includes a switch device selected from the group consisting of an insulated gate bipolar transistor (IGBT), a field effect transistor (FET), gate turn off devices; IGCT insulated gate commutating thyristors.

\* \* \* \* \*